Figure 1:
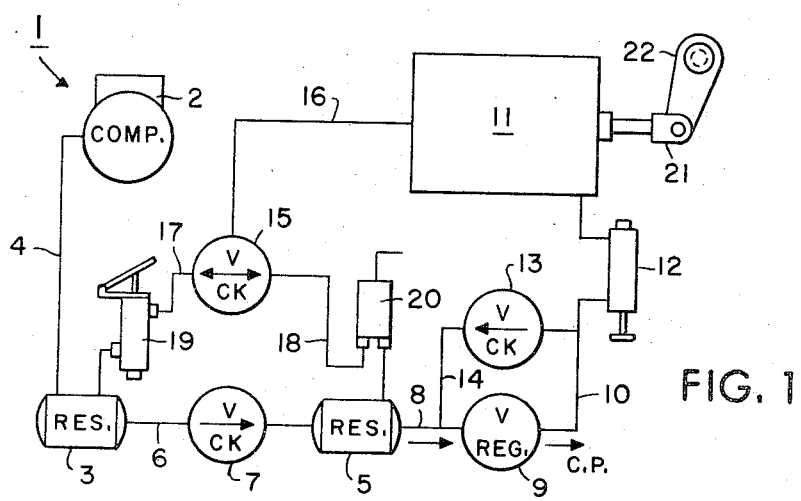

INVENTOR
CYRIL B. FITES
BY Joseph E. Papin

United States Patent Office 3,347,600
Patented Oct. 17, 1967

3,347,600
PRESSURE BALANCED SPRING APPLIED
BRAKE SYSTEM
Cyril B. Fites, St. John, Mo., assignor to Wagner Electric Corporation, St. Louis, Mo., a corporation of Delaware
Filed Mar. 11, 1965, Ser. No. 438,860
10 Claims. (Cl. 303—71)

This invention relates to fluid pressure systems and in particular to friction device operating mechanisms therefor.

In the past, friction device operating mechanisms and fluid pressure systems therefor, resiliently urged means, such as spring loaded piston means, were utilized to mechanically effect energization of a friction device associated therewith, and said piston means was normally urged against said spring toward an inoperative position in response to fluid pressure in excess of a predetermined value acting on said piston means; however, when the fluid pressure was reduced to a value less than the predetermined value, the compressive force of said spring moved said piston means toward an operative position to effect the mechanical energization of said friction device. One of the undesirable or disadvantageous features of such past friction device operating mechanisms and systems therefor was that the compressive force of the spring was necessarily relatively great since it mechanically moved the piston means against the force of the fluid pressure acting thereon. Another disadvantageous or undesirable feature of the past friction device operating mechanisms and systems therefor was that the extension of the spring upon mechanical energization of the friction device normally served to reduce the compressive force (spring rate) thereof, and such spring extension moved the piston means in the friction device operating mechanism to reduce the volume of the fluid pressure acting thereon which, of course, served to increase the value of the fluid pressure; therefore, in many instances, the spring urged movement of the piston means served to increase the force of the fluid pressure acting thereon to again balance the compressive force of the spring which was reduced upon spring extension. And still another undesirable or disadvantageous feature of the past friction device operating mechanisms and systems therefor was that the fluid pressure acting on the piston means against the spring was necessarily vented to atmosphere by the operator to manually effect an emergency mechanical energization of the friction device which appreciably reduced the fluid pressure available for future friction device energization.

The principal object of the present friction device operating mechanism and system therefor is to overcome the aforementioned undesirable or disadvantageous features, and this and other objects of the present invention will become apparent hereinafter.

Briefly, the invention embodies a friction device operating mechanism having resiliently urged means defining therein opposed fluid pressure responsive chambers, said resiliently urged means being normally urged toward an inoperative position in response to fluid pressure in one of said chambers and being movable toward an operative position to mechanically energize a friction device associated therewith upon the introduction of fluid pressure into the other of said chambers. The invention also embodies a fluid pressure system having a source of fluid pressure, and means normally connecting said one friction device operating mechanism chamber with said source including means for introducing fluid pressure into said other friction device operating mechanism chamber.

Figure 2:
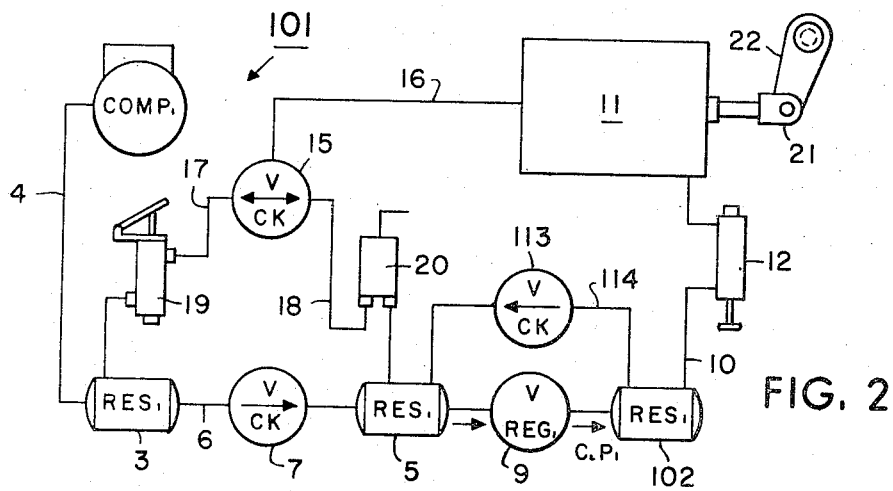
Figure 3:
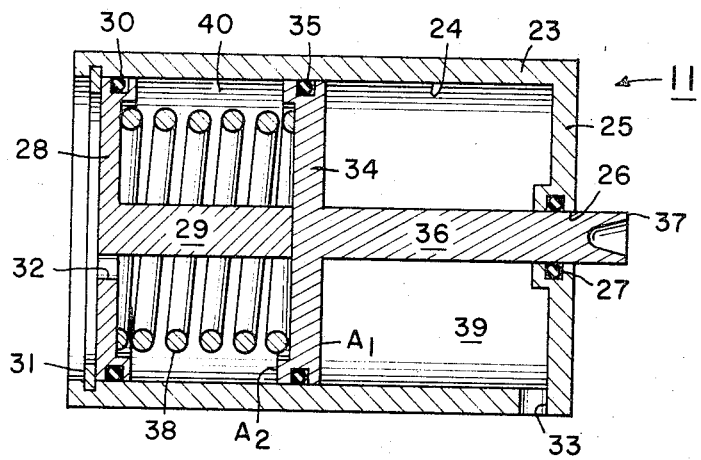

In the drawings which illustrate embodiments of the invention,

FIGS. 1 and 2 are diagrammatic views of fluid pressure systems showing a friction device operating mechanism therein, and FIG. 3 is a sectional view showing the friction device operating mechanism of FIGS. 1 and 2 in cross-section.

Referring now to FIG. 1 in detail, a fluid pressure system, indicated generally at 1, is provided with a compressor 2 which is connected with a main or system reservoir 3 by a conduit 4, said compressor and main reservoir defining in combination a fluid pressure source. The main reservoir 3 is connected with a branch or protected reservoir 5 by a conduit 6 having a uni-directional flow or check valve 7 interposed therein, and it is apparent that said reservoir 5 is a protected reservoir since said uni-directional flow valve prevents the reduction or depletion of fluid pressure therein due to a malfunctioning compressor and/or leaks or the like in the system 1 ahead of said uni-directional flow valve. A conduit 8 is connected between the reservoir 5 and the inlet side of a pressure regulating valve 9, and another conduit 10 is connected between the outlet side of said pressure regulating valve and an emergency or release port of a friction device operating mechanism or actuating cylinder, indicated generally at 11, said conduit 10 having a push-pull type hand valve 12 interposed therein. The pressure regulating valve 9 is of a type well known to the art providing a relatively constant fluid pressure at the outlet side thereof in response to a relatively greater fluid pressure at the inlet side thereof, and the push-pull valve 12 is also of a type well known in the art being operable between a connecting position providing pressure fluid communication between the outlet side of said pressure regulating valve and the emergency port of the actuating cylinder 11 and a venting position interrupting said pressure fluid communication and venting said actuating cylinder emergency port to the atmosphere. A by-pass uni-directional flow or check valve 13 is provided in shunt relation with the pressure regulating valve 9 being interposed in a by-pass conduit 14 which has opposed ends respectively interconnected with the conduits 8 and 10. A two-way check valve 15 has the output side thereof connected with an equalizer or control port of the actuating cylinder 11 by a conduit 16, and conduits 17 and 18 respectively connect the opposed input side of said two-way check valve with the reservoirs 3 and 5, said conduits 17 and 18 having a modulating or metering application valve 19 and hand valve 20 of types well known in the art respectively interposed therein. To complete the description of the fluid pressure system 1, the actuating cylinder 11 is operatively connected through linkage 21 with a slack adjuster 22 of a friction device (not shown).

The actuator cylinder 11, FIG. 3, is provided with a housing 23 having a bore 24 therein. The rightward end of the housing bore 24 is closed by a housing end wall 25 having a push rod receiving aperture or bore 26 centrally located therein, and a sealing element 27 is disposed in said aperture. The leftward end of the housing bore 24 is closed by a closure member 28 having an axially extending stop 29 thereon, and said closure member carries a peripheral sealing element 30 in sealing engagement with said housing bore. A snap ring and groove assembly 31 is provided in the housing bore 24 adjacent to the leftward end thereof for abutting displacement preventing engagement with the closure member 28. An equalizer or control port 32 which receives the conduit 16, as previously mentioned, is provided through the closure member 28, and a release or emergency port 33 which receives the conduit 10, as previously mentioned, is provided in the housing 23 connecting with the housing bore 24 adjacent to the housing end wall 25.

A piston member 34 is slidable in the housing bore 24 between the housing end wall 25 and the closure member stop 29, and a peripheral sealing element 35 is carried by said piston member in sealing engagement with said housing bore. The piston 34 is provided with an integral extension or push rod 36 which is slidably received in the end wall aperture 26 in sealing engagement with the sealing element 27, and said extension is provided with a working end portion 37 exteriorly of the housing 23 which is operatively connected with the linkage 21, as previously mentioned. Although the diameter of the extension 36, as shown, is relatively less than that of the piston 34, it is apparent that the extension diameter can be increased to effectively reduce the effective fluid pressure responsive area $A_1$ on the rightward side or face of said piston, and it is also apparent that the effective fluid pressure responsive area $A_1$ is less than the effective fluid pressure responsive area $A_2$ on the leftward side or face of said piston. An operating or emergency spring 38 is biased between the closure member 28 and the leftward face of the piston 34 urging said piston in a working direction to energize or actuate the working end 37 of the extension 36. To complete the description of the actuating cylinder 11, an expansible fluid pressure release or emergency chamber 39 is defined in the housing bore 24 between the housing end wall 25 and the rightward face of the piston 34 in open pressure fluid communication with the release port 33, and another expansible fluid pressure equalizer or control chamber 40 is also defined in said housing bore between the closure member 28 and the leftward face of said piston in open pressure fluid communication with the control port 32.

Under normal operating conditions with the reservoirs 3, 5 charged to their normal operating fluid pressure by pressure fluid flow from the compressor 2 through the conduit 4 to said reservoir 3 and therefrom through the conduit 6 and check valve 7 into said reservoir 5, the control chamber 40 is normally vented to atmosphere through the control port 32, the conduit 16 and the two-way check valve 15 to the exhaust of either the application valve 19 or the hand valve 20 through conduit 17 or 18; and, with the push-pull valve 12 in the connecting position thereof, fluid pressure flows from the protected reservoir 5 through the conduit 8, the pressure regulating valve 9, the conduit 10 and said push-pull valve into the release port 33 of the actuating cylinder 11 and therefrom into the release chamber 39. It should be noted that the pressure regulating valve 9 is responsive to the fluid pressure supplied thereto from the protected reservoir 5 to normally maintain the magnitude of the fluid pressure delivered therefrom to the release chamber 39 at a substantially constant, predetermined value $P_c$. In this manner, the fluid pressure $P_c$ in the release chamber 39 acts on the effective area $A_1$ of the piston 34 to create a substantially constant force $F_c$ in opposition to the compressive force $F_s$ of the spring 38 and having a magnitude great enough to overcome the force $F_s$ and move said piston toward its inoperative position in abutting engagement with the closure member stop 29. Ideally with the piston 34 in abutment with the closure member stop 29, the force $F_c$ balances the force $F_s$ at that specific deflection of the spring 38. With the component parts of the system 1 and actuator cylinder 11 in their normal operating positions, as described above and as shown in FIGS. 1 and 3, the friction device (not shown) associated therewith is de-energized.

Under normal vehicle operating conditions, if the operator desires to effect energization of the friction device for deceleration purposes or a complete stop, an operator applied force on the application valve 19 meters fluid pressure from the main reservoir 3 through the conduit 17, said application valve, the two-way check valve 15 and the conduit 16 to the control port 32 of the actuating cylinder 11 and therefrom into the control chamber 40. Fluid pressure so established in the control chamber 40 acts on the effective are $A_2$ of the piston 34 therein creating an application force $F_a$ which is additive to the spring force $F_s$ and in opposition to the force $F_c$. Since the opposing forces $F_s$ and $F_c$ are normally substantially balanced, as mentioned hereinbefore, any increase in the magnitude of the application force $F_a$ serves to move the piston 34 and extension 36 rightwardly to actuate the extension working end 37 and the linkage 21 to rotate the slack adjustor 22 and effect energization of the friction device associated therewith.

The rightward movement of the piston 34 upon friction device energization also serves to decrease the volume of the release chamber 39 and thereby appreciably increases the magnitude of the fluid pressure $P_c$; however, the by-pass check valve 13 is responsive to increases in the fluid pressure $P_c$ above the magnitude of the fluid pressure in the protected reservoir 5 to bleed-off or by-pass a portion of the increased magnitude of the fluid pressure $P_c$ to said protected reservoir through the by-pass conduit 14 to effectively reduce the fluid pressure $P_c$ to that of the reservoir 3. In this manner, the by-pass check valve 13 not only serves to reduce the increased fluid pressure $P_c$, which is coincidental with the volumetric reduction of chamber 39, in order to reduce the force $F_c$ opposing the spring force $F_s$, which is reduced upon expansion of the spring 38 from the predetermined deflection thereof, but also serves to replenish the fluid pressure supply in the protected reservoir 5 in order to obviate the necessity of supplying make-up fluid pressure thereto from the main reservoir 3.

When the desired rate of deceleration is effected or the complete stop attained, the operator removes the applied force from the application valve 19 to exhaust the fluid pressure from the control chamber 40 through the control port 32, the conduit 16, the two-way valve 15, the conduit 17 and said application valve to the atmosphere thereby eliminating the application force $F_a$. Upon elimination of the application force $F_a$, the force $F_c$ serves to move the piston 34 leftwardly against the spring force $F_s$ toward its inoperative position thereby again effecting expansion of the chamber 39 to its original volume, and the pressure regulating valve 9 meters fluid pressure from the protected reservoir 5 into the chamber 39, as previously described, to increase the fluid pressure $P_c$ to its predetermined value, if necessary. When the fluid pressure $P_c$ re-attains its predetermined value, the force $F_c$ once again balances the spring force $F_s$ to maintain the piston 34 in the inoperative position thereof.

Under emergency operating conditions which occur in the event of complete loss of fluid pressure from the main reservoir 3 of the system 1, or a reduction in the fluid pressure at said main reservoir to a level seriously impairing braking application effectiveness, the operator may actuate the hand valve 20 to meter fluid pressure from the protected reservoir 5 through the conduit 18, the two-way check valve 15, the conduit 16 and the control port 32 into the control chamber 40 to effect a metered or controlled actuation of the actuating cylinder 11 for energizing the friction device in the same manner as previously described. Initiation of friction device energization under such emergency conditions by metering fluid pressure through the hand valve 20 insures a complete, smooth or metered stop of the vehicle instead of an undesirable, unexpected, sudden emergency braking application.

Of course, the system 1 may be "dynamited," if desired, to simulate a braking application under emergency conditions by manually moving the push-pull valve 12 from the connecting position to the venting position thereof interrupting pressure fluid communication between the pressure regulating valve 9 and the release chamber 39 and venting said release chamber to atmosphere through the conduit 10 and said push-pull valve. The exhaustion of fluid pressure from the release chamber 39 eliminates the force $F_c$ and permits the spring force $F_s$ to mechanically move the piston 34 toward its operative position thereby effecting mechanical energization of the friction device. In this manner, it is possible to effect mechanical energization of the friction device under simulated emergency conditions and also under actual emergency conditions, such as in the event fluid pressure at the main and the protected reservoirs 3, 5 is unavailable due to a malfunctioning compressor and/or leaks in the system 1 or the like. Of course, if the fluid pressure in the protected reservoir 5 is available, the hand valve 20 may be utilized, as previously described, to meter fluid pressure into the control chamber 40 establishing force $F_a$ to assist the spring force $F_s$ when the system is "dynamited." It should be noted that the system 1 may be "dynamited" for parking purposes by moving the push-pull valve 12 to the venting position thereof, and since vehicle inertia or deceleration is non-existent during parking, it is therefore obvious that the compressive force or spring rate of the spring 38 may be relatively less than those previously employed in past friction device operating mechanisms. In other words, the spring 38 utilized in the actuating cylinder 11 may be designed to be of lesser strength or compressive force since it can be assisted by the force $F_a$ and since vehicle inertia and/or deceleration is non-existent during parking.

Referring now to FIG. 2 in detail, a fluid pressure system 101 is shown having substantially the same component parts and functioning in substantially the same manner as the previouly described system 1 with the following exceptions. The system 101 is provided with an expansion reservoir 102 which is interposed in the conduit 10 between the outlet side of the pressure regulating valve 9 and the push-pull valve 12. A by-pass uni-directional flow or check valve 113 is provided in shunt relation with the pressure regulating valve 9 being interposed in a by-pass conduit 114 which has opposed ends respectively connected with the protected and expansion reservoirs 5 and 102. The volumetric capacity of the expansion reservoir 102 supplements that of the release chamber 39 of the actuating cylinder 11 to effectively minimize the increase of the fluid pressure $P_c$ in excess of the predetermined value thereof upon the reduction of the volumetric capacity of said release chamber which is coincidental with braking application, as previously described hereinbefore. In other words, in the usual pressure-volume relationship an increase in volume will serve to minimize any pressure increase; however, the by-pass check valve 113 is provided to bleed-off or by-pass the protected reservoir 5 any increase in the fluid pressure $P_c$ in excess of the magnitude of that in said protected reservoir 5.

From the foregoing, it is now apparent that a novel friction device operating mechanism 11 and systems 1 and 101 therefor are provided meeting the objects and advantages set out hereinbefore, as well as other objects and advantages, and that changes or modifications as to the precise configurations, shapes and details of the constructions set forth in the disclosure by way of illustration may be made by those skilled in the art without departing from the spirit of the invention, as defined by the claims which follow.

The embodiments of the invention in which an exclusive property or privilege is claimed are defined as follows:

1. A fluid pressure system for a friction device comprising a fluid pressure source, actuator means including resiliently urged means movable therein to control friction device energization, other means for normally supplying fluid pressure from said source to said resiliently urged means at a predetermined magnitude to substantially balance the compressive force of said resiliently urged means and prevent friction device energization, selectively operable means for metering fluid pressure from said source to said resiliently urged means to supplement the compressive force thereof and move said resiliently urged means in a friction device energizing direction, and unidirectional valve means connected in by-pass relation with said other means between said one chamber and source and providing pressure fluid flow from said one chamber to said source in the event that the contraction of said one chamber upon movement of said resiliently urged means in the friction device energizing direction increases the fluid pressure in said one chamber to a magnitude in excess of that of the fluid pressure at said source.

2. A fluid pressure system for a friction device comprising a fluid pressure source, actuator means including resiliently urged means defining therein a pair of opposed expansible and contractable fluid pressure chambers and movable to control friction device energization, regulating means responsive to fluid pressure at said source for supplying fluid pressure therefrom to one of said chambers at a predetermined relatively constant magnitude, the predetermined magnitude of the fluid pressure in said one chamber acting on said resiliently urged means therein to establish a force in opposition to and substantially equal to the compressive force of said resiliently urged means to normally prevent friction device energization, selectively operable means for metering fluid pressure from said source to the other of said chambers, the metered fluid pressure in said other chamber acting on said resiliently urged means therein to establish another force supplemental to the compressive force of said resiliently urged means for moving said resiliently urged means in a friction device energizing direction against said first named force to contract said one chamber, and means for connecting said one chamber and source when the magnitude of the fluid pressure in said one chamber exceeds a value predeterminately greater than the predetermined value thereof due to the contraction of said one chamber in response to the friction device energizing movement of said resiliently urged means.

3. The fluid pressure system according to claim 2 wherein said last named means includes a fluid pressure expansion reservoir connected between said one chamber and said first named means for receiving fluid pressure from said one chamber upon the contraction thereof and to limit the magnitude of the increased fluid pressure in said one chamber in excess of the predetermined magnitude.

4. A fluid pressure system for a friction device comprising a fluid pressure source, actuator means having a pair of opposed expansible and contractable fluid pressure chambers therein, resiliently urged means movable in said actuator means between said chambers to control friction device energization and normally opposing fluid pressure expansion of one of said chambers, fluid pressure regulating means responsive to fluid pressure at said source for supplying fluid pressure therefrom to said one chamber at a relatively constant magnitude predeterminately less than that of the fluid pressure at said source, said resiliently urged means being movable against the compressive force thereof toward a friction device de-energizing position to contract the other of said chambers and expand said one chamber in response to the fluid pressure supplied to said one chamber, selectively operable metering means for metering fluid pressure from said source to said other chamber acting on said resiliently urged means to supplement the compressive force thereof, said resiliently urged means being movable toward a friction device energizing position to expand said other chamber and contract said one chamber in response to metered fluid pressure in said other chamber, and means for connecting said one chamber with said source to limit fluid pressure increase in excess of a predetermined value in said one chamber in response to the contraction upon the friction device energizing movement of said resiliently urged means.

5. The fluid pressure system according to claim 4 wherein said last named means includes unidirectional valve means connected in by-pass relation with said fluid pressure regulating means between said one chamber and source and providing pressure fluid flow from said one chamber to said source in the event the contraction of said one chamber increases the fluid pressure supplied thereto to a magnitude in excess of the magnitude of the fluid pressure at said source.

6. The fluid pressure system according to claim 4 including other means selectively operable to interrupt pressure fluid communication between said fluid pressure regulating means and said one chamber and vent said one chamber to the atmosphere, the compressive force of said resiliently urged means serving to mechanically effect movement thereof in the friction device energizing direction when said one chamber is vented to atmosphere.

7. The fluid pressure system according to claim 4 including a main fluid pressure source, means for connecting said first named source in only pressure fluid receiving relation with said main source, other selectively operable metering means for metering fluid pressure from said main source to said other chamber, and a two-way check valve connected between said first named and other metering means and said other chamber.

8. The fluid pressure system according to claim 4 wherein said last named means includes a fluid pressure reservoir having a relatively large volumetric capacity connected between said one chamber and said fluid pressure regulating means for absorbing displaced fluid pressure from said one chamber upon the contraction of said one chamber to thereby limit the fluid pressure increase in said one chamber in excess of the predetermined magnitude.

9. A fluid pressure system for controlling a friction device comprising a fluid pressure source, a friction device operating mechanism including a housing having a pair of opposed expansible and contractable fluid pressure chambers therein, piston means movable in said housing between said chambers and having a portion extending exteriorly of one of said chambers for operative connection with said friction device, spring means in the other of said chambers engaged between said housing and piston means to oppose fluid pressure expansion of said one chamber and urge said piston means in a friction device energizing direction, fluid pressure regulating means connected between said source and said one chamber and normally supplying fluid pressure having a substantially constant value to said one chamber, the fluid pressure in said one chamber acting on the effective area of said piston means therein to establish a force for moving said piston means in a friction device de-energizing direction against said spring means toward a position in said housing substantially balancing the compressive force of said spring means, fluid pressure metering means connected between said source and said other chamber normally providing for exhaustion of said other chamber to the atmosphere and being selectively operable to meter fluid pressure from said source to said other chamber, the metered fluid pressure in said other chamber acting on the effective area of said piston means therein to establish another force supplemental to the compressive force of said spring means for moving said piston means in the friction device energizing direction, said one chamber being contracted upon the movement of said piston means in the friction device energizing direction to thereby increase the fluid pressure therein opposing such movement to a value in excess of the normal constant value thereof, and means for limiting the increased value of the fluid pressure in said one chamber upon contraction thereof including uni-directional check valve means connected in by-pass relation with said fluid pressure regulating means between said one chamber and said source and providing pressure fluid flow only from said one chamber to said source when the increased value of the fluid pressure in said one chamber exceeds the value of the fluid pressure at said source.

10. A fluid pressure system comprising a fluid pressure source, actuator means having a pair of opposed expansible and contractable fluid pressure chambers therein, resiliently urged means movable in said actuator means between said chambers and normally opposing fluid pressure expansion of one of said chambers, fluid pressure regulating means for supplying fluid pressure from said source to said one chamber at a predetermined magnitude, said resiliently urged means being movable in one direction against the compressive force thereof toward an inoperative position to contract the other of said chambers and expand said one chamber in response to the fluid pressure supplied to said one chamber, selectively operable means for metering fluid pressure from said source to said other chamber acting on said resiliently urged means to supplement the compressive force thereof, said resiliently urged means being movable in a direction opposite the one direction toward an operative position to expand said other chamber and contract said one chamber in response to metered fluid pressure in said other chamber, and unidirectional valve means connected in by-pass relation with said fluid pressure regulating means between said one chamber and source and providing pressure fluid flow from said one chamber to said source in the event the contraction of said one chamber increases the fluid pressure supplied thereto to a magnitude in excess of the magnitude of the fluid pressure at said source.

References Cited
UNITED STATES PATENTS

| | | | |
|---|---|---|---|
| 2,856,222 | 10/1958 | Gossett et al. | 91—165 X |
| 2,942,917 | 6/1960 | Swander | 303—5 |
| 3,163,092 | 12/1964 | Masser | 303—71 X |
| 3,168,353 | 2/1965 | Horowitz | 303—71 X |

EUGENE G. BOTZ, *Primary Examiner.*